(12) United States Patent
Videt et al.

(10) Patent No.: US 8,817,499 B2
(45) Date of Patent: Aug. 26, 2014

(54) CONTROL METHOD AND SYSTEM FOR REDUCING THE COMMON-MODE CURRENT IN A POWER CONVERTER

(75) Inventors: Arnaud Videt, Vernon (FR); Philippe Loizelet, Le Plessis Hebert (FR); Mohamet Thiam, Cergy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 307 days.

(21) Appl. No.: 13/238,036

(22) Filed: Sep. 21, 2011

(65) Prior Publication Data

US 2012/0081932 A1    Apr. 5, 2012

(30) Foreign Application Priority Data

Oct. 4, 2010 (FR) ...................................... 10 57995

(51) Int. Cl.
*H02M 5/458* (2006.01)
(52) U.S. Cl.
USPC .......................................................... 363/37
(58) Field of Classification Search
CPC .............................................. H02M 2001/123
USPC .......................................... 363/34–37, 51, 41
See application file for complete search history.

(56) References Cited

U.S. PATENT DOCUMENTS

| 6,185,115 | B1 | 2/2001 | Sul et al. |
| 7,738,267 | B1 | 6/2010 | Tallam et al. |
| 2008/0298103 | A1* | 12/2008 | Bendre et al. ................... 363/89 |
| 2010/0172162 | A1 | 7/2010 | Tallam et al. |

FOREIGN PATENT DOCUMENTS

JP     2003-18853     1/2003

OTHER PUBLICATIONS

A. M. De Broe, "Neutral-to-ground voltage minimization in a PWM-rectifier/inverter configuration", Power Electronics and Variable Speed Drives, Conference Publication No. 429, XP-002615871, Sep. 23-25, 1996, pp. 564-568.
French Preliminary Search Report and Written Opinion issued Jan. 20, 2011, in French 1057995, filed Oct. 4, 2010 (with English Translation of Categories of Cited Documents), 8 pages considered.

* cited by examiner

*Primary Examiner* — Harry Behm
(74) *Attorney, Agent, or Firm* — Oblon, Spivak, McClelland, Maier & Neustadt, L.L.P.

(57) ABSTRACT

The invention relates to a control method and system intended to reduce the common-mode current in a power converter which comprises a rectifier stage (1, 1') connected to a number of input phases (R, S, T) and an inverter stage (2, 2') connected to a number of output phases (U, V, W). On each switching period, the rectifier stage (1, 1') and the inverter stage (2, 2') are controlled in a synchronized manner so that a variation of potential applied to an input phase (R, S, T) always corresponds to a variation of potential of the same sign applied to an output phase (U, V, W).

11 Claims, 4 Drawing Sheets

Figure 1:
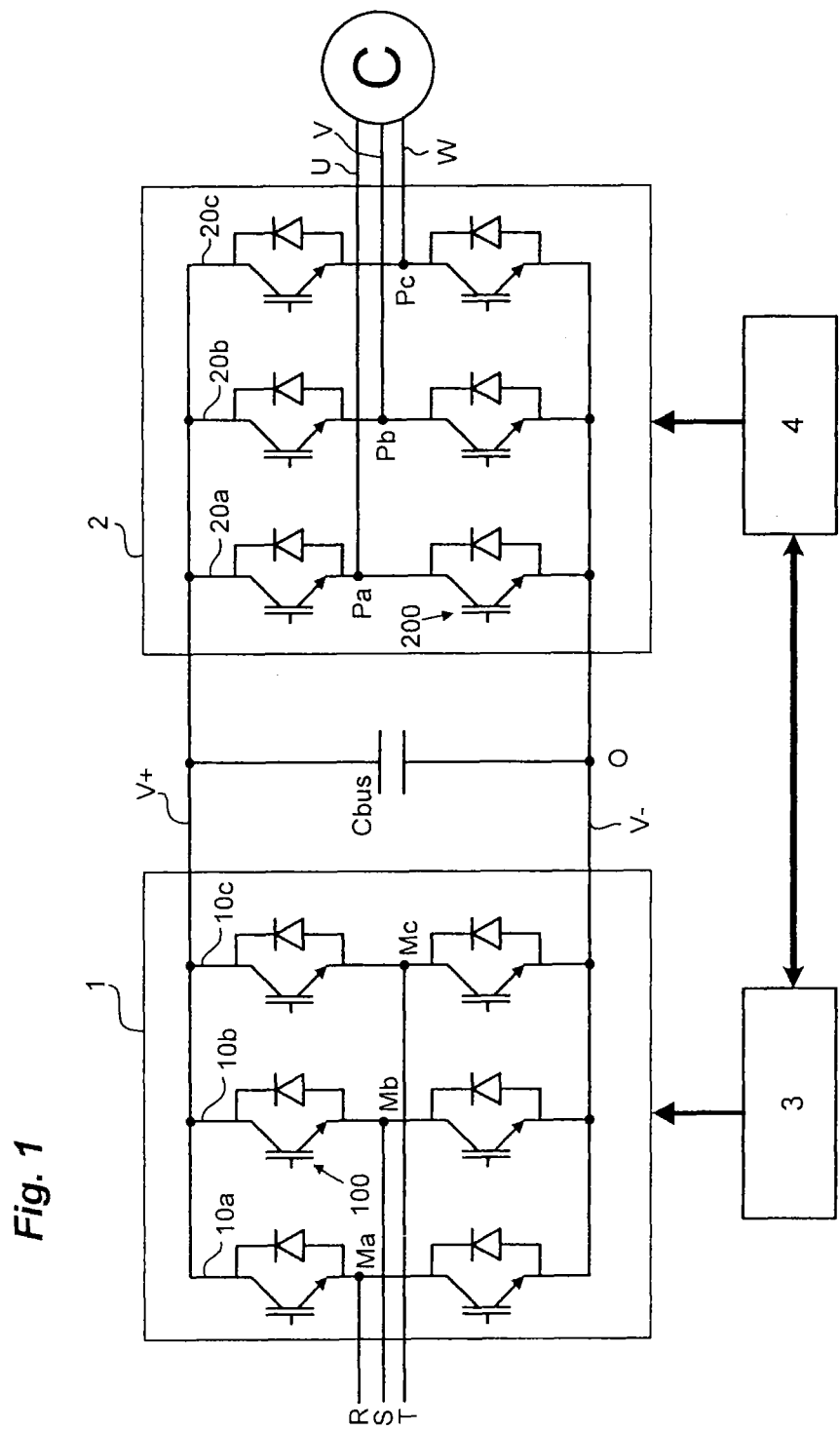

CONTROL METHOD AND SYSTEM FOR REDUCING THE COMMON-MODE CURRENT IN A POWER CONVERTER

The present invention relates to a control method and system for reducing the voltage and the common-mode current in a power converter.

A power converter comprises a number of input phases connected to the mains supply, for example three input phases if it is connected to a three-phase mains supply. Connected to its input phases, a conventional converter comprises a rectifier stage for converting the AC voltage supplied by the mains supply into a DC voltage. The converter also comprises a power supply bus provided with a first power supply line with positive potential and a second power supply line with negative potential to which is applied the DC voltage, and a bus capacitor connected between the first power supply line and the second power supply line and intended to keep the DC voltage constant on the bus. Downstream of the bus capacitor, a power converter of variable speed drive type also comprises an inverter stage provided with a number of switching arms, usually three switching arms, each connected to an output phase connected to an electrical load. Each switching arm is connected between the first power supply line and the second power supply line of the bus and comprises, for example in the case of a two-level converter, two controlled power transistors for converting the DC voltage into a variable voltage intended for the electrical load.

The rectifier stage placed at the input of the converter may be of the active type by also comprising a number of switching arms each provided, for example, with at least two power transistors. These transistors are each controlled by a gate control device in order to be able to convert the AC voltage from the mains supply into a DC voltage applied to the power supply bus. This type of converter with an active rectifier stage at the input is commonly called "active front end".

Conventionally, the controls for the power switches of the rectifier stage and of the inverter stage are produced by pulse width modulation (hereinafter PWM). A PWM of intersective type consists in comparing a symmetrical or asymmetrical triangular carrier with one or more modulants. For a power transistor of the inverter stage or of the rectifier stage, the intersections between a carrier and one or more modulants define the instants of switchover when the transistor closes and opens.

It is known that the increase in the switching frequency applied to an inverter stage causes the common-mode current to rise, this being due to an increase in the density of dv/dt variations of the common-mode voltage. The common-mode current generated may take different paths between a variable speed drive and an electrical load. These paths are created by capacitive couplings generated between the conductors of the cable linking the variable speed drive to the electrical load, between the windings of the motor and the stator or between the power semiconductors and the dissipater linked to the earth, etc. When the variable speed drive comprises an inverter stage and an active rectifier stage, the total common-mode voltage of the variable speed drive is the sum of the disturbances provided by the rectifier stage and by the inverter stage.

Various solutions have been developed for reducing the common-mode current. These solutions may involve the addition of a passive filter or an action on the controls of the rectifier stage and of the inverter stage.

The document JP2003018853 proposes, for example, a method for reducing the common-mode current in a variable speed drive by synchronizing the switchover on the closure (or on the opening) of three power switches (high or low) of the rectifier stage with the switchover on the closure (or on the opening) of the three corresponding switches (respectively high or low) of the inverter stage. This solution makes it possible to reduce the size of the filter employed to filter the common-mode current and therefore to reduce the costs of the converter. However, it does not make it possible to sufficiently reduce the common-mode current in the variable speed drive.

The U.S. Pat. No. 6,185,115 also describes a method for synchronizing the switchovers of the rectifier stage with the switchovers of the inverter stage so as to reduce the common-mode voltage. As for the document cited previously, this method is not satisfactory because it does not make it possible to sufficiently reduce the common-mode voltage in the variable speed drive. In fact, the proposed method consists in synchronizing the switchover of a single switching arm of the inverter stage, in rising and falling edges, with the switchover of a single switching arm of the rectifier stage which makes it possible, for a switching period, to change only from 12 voltage edges to 8 voltage edges on all the switching arms.

The aim of the invention is to propose a control method that makes it possible to significantly reduce the common-mode voltage and current in a power converter.

This aim is achieved by a control method intended to reduce the common-mode current in a power converter which comprises:
- a rectifier stage connected to a number of input phases and an inverter stage connected to a number of output phases,
- a DC power supply bus linking the rectifier stage to the inverter stage and comprising a first power supply line and a second power supply line to each of which is applied an electrical potential,
- the rectifier stage and the inverter stage each comprising at least two switching arms connected to the first power supply line and to the second power supply line,
- first control means of the rectifier stage for selectively connecting, during a switchover time, each input phase to the first power supply line or to the second power supply line,
- second control means of the inverter stage for selectively connecting, during a switchover time, an output phase to the first power supply line or to the second power supply line,
- on each switching period, the rectifier stage and the inverter stage being controlled in a synchronized manner so that a variation of potential applied to an input phase always corresponds to a variation of potential of the same sign applied to an output phase.

According to a particular feature, the rectifier stage and the inverter stage are controlled in a synchronized manner by action on the pulse width modulation applied to the rectifier stage and to the inverter stage.

According to another particular feature, the rectifier stage and the inverter stage are controlled in a synchronized manner by following determination rules, each determination rule taking account of the switchover time of each switching arm of the inverter stage and of the rectifier stage.

The invention also relates to a control system intended to reduce the common-load current in a power converter which comprises:
- a rectifier stage connected to a number of input phases and an inverter stage connected to a number of output phases,
- a DC power supply bus linking the rectifier stage to the inverter stage and comprising a first power supply line and a second power supply line to each of which is applied an electrical potential, the rectifier stage and the inverter stage each comprising at least two switching arms connected to the first power supply line and to the second power supply line, first control means of the rectifier stage employing a pulse width modulation to selectively connect each input phase to the first power supply line or to the second power supply line, second control means of the inverter stage employing a pulse width modulation to selectively connect an output phase to the first power supply line or to the second power supply line, characterized in that the first control means of the rectifier stage and the second control means of the inverter stage are synchronized so that a variation of potential applied to an input phase always corresponds to a variation of potential of the same sign applied to an output phase.

According to a particular feature, the rectifier stage and the inverter stage each comprise three switching arms with two power transistors on each switching arm.

According to another particular feature, the rectifier stage and the inverter stage are configured so as to be able to generate the same number of electrical potential levels.

According to another particular feature, the inverter stage is, for example, of NPC type.

Figure 2:
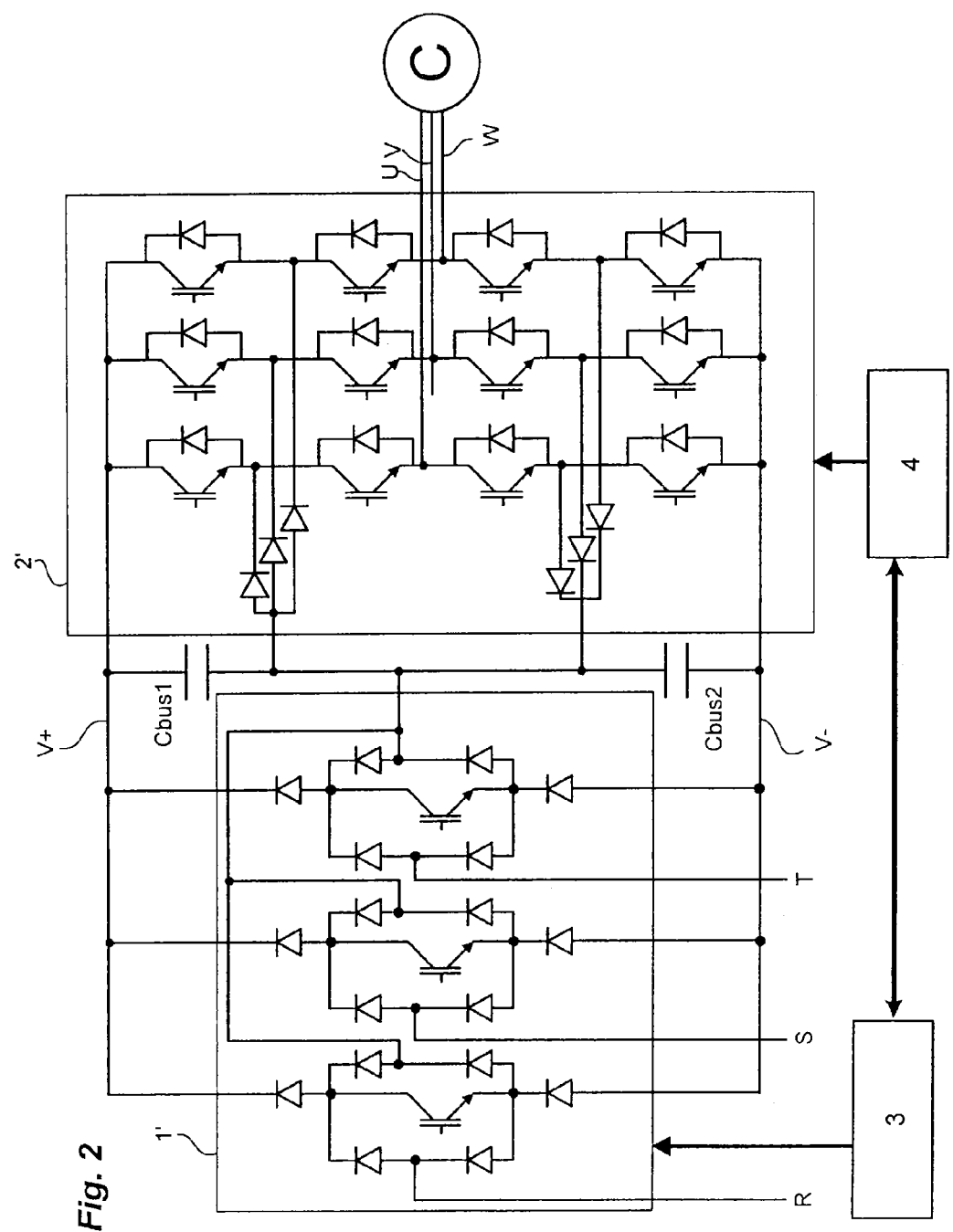
Figure 3:
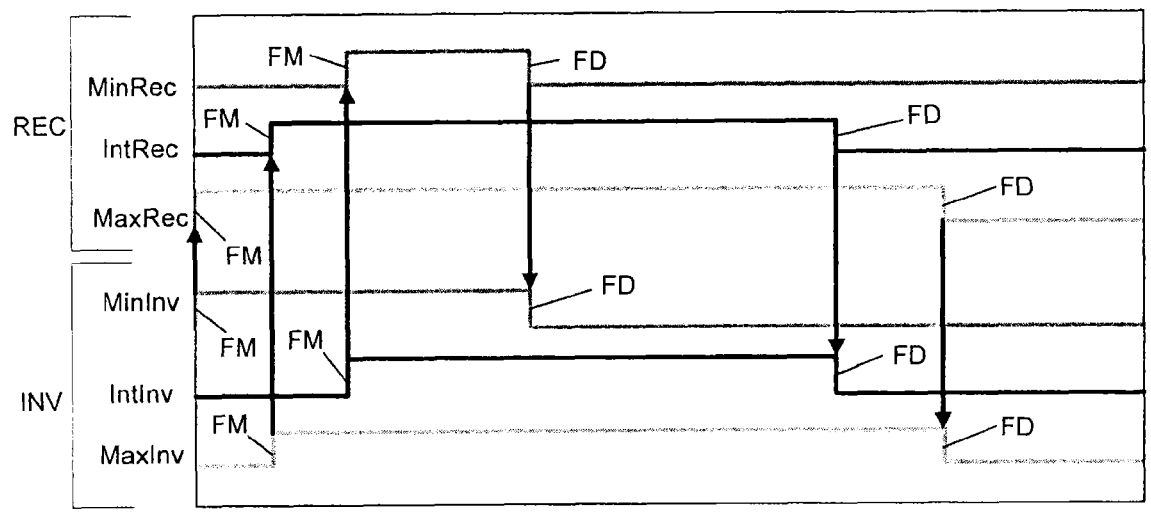
Figure 4:
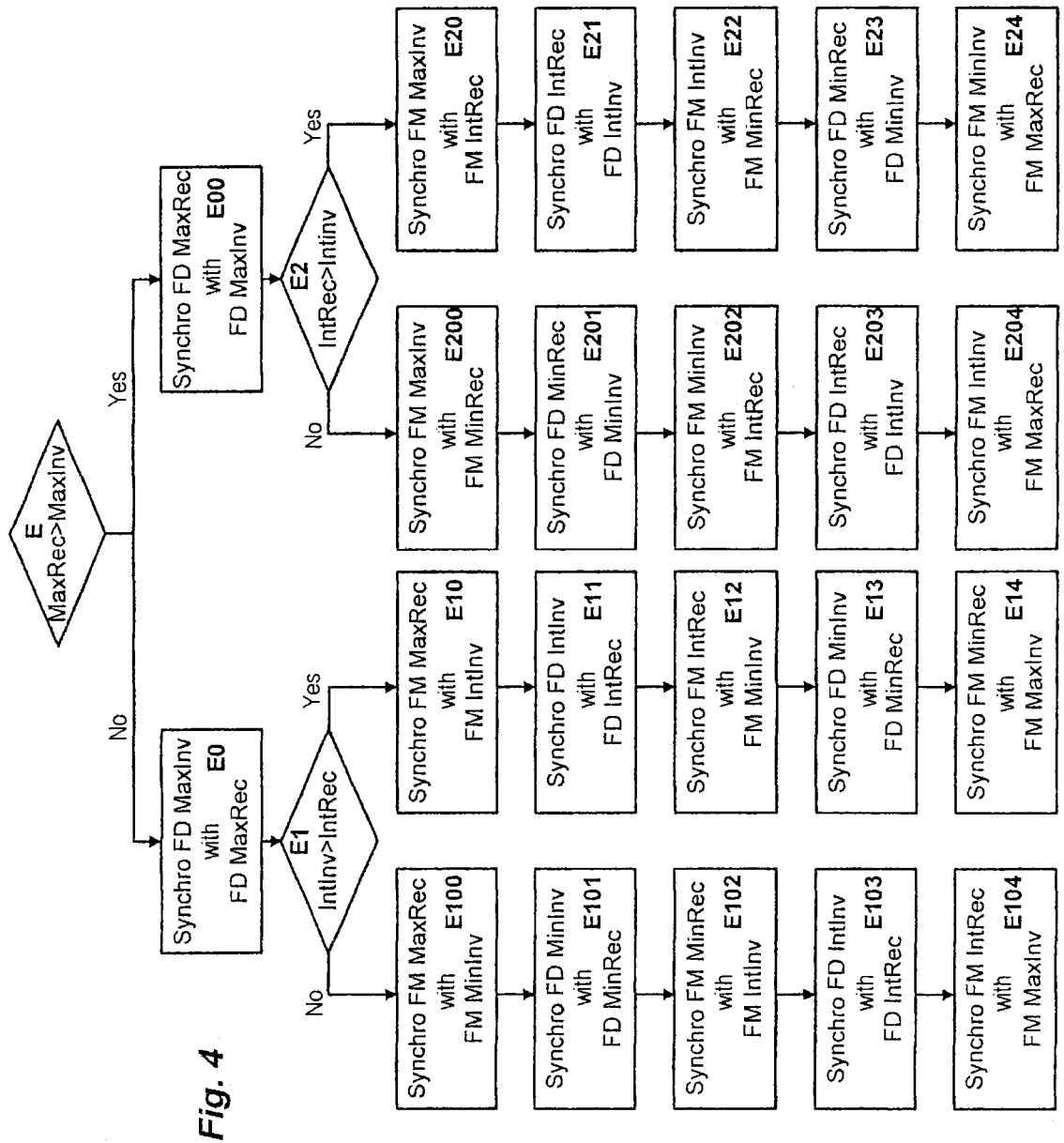

Other features and advantages will emerge from the following detailed description by referring to an embodiment given as an example and represented by the appended drawings in which:

FIG. 1 represents a power converter of variable speed drive type provided with a two-level inverter stage and an active rectifier, FIG. 2 represents a power converter of variable speed drive type provided with a three-level inverter stage of NPC (Neutral Point Clamped) type and a three-level active rectifier of Wien bridge type, FIG. 3 illustrates the principle of synchronization between the control of the switching arms of the rectifier stage and the control of the switching arms of the inverter stage, FIG. 4 represents, in the form of a functional diagram, an exemplary algorithm implemented in the inventive control method.

With reference to FIGS. 1 and 2, as is known, a power converter, for example of variable speed drive type, comprises a rectifier stage 1, 1', a DC power supply bus and an inverter stage 2, 2'. Different power converter configurations are possible. The present invention applies most particularly to the power converters comprising an active rectifier stage.

FIG. 1 represents, for example, a two-level variable speed drive provided with an active rectifier stage 1. FIG. 2 represents, for example, a three-level variable speed drive employing an inverter stage 2' of NPC (Neutral Point Clamped) type and an active rectifier stage 1' of Wien bridge type. Other configurations are possible, such as the use of an inverter stage with flying capacitor.

With reference to FIG. 1, the rectifier stage 1 is connected to the mains supply via AC inductances (not represented), for example on three input phases R, S, T for a three-phase rectifier stage 1. Usually, in a variable speed drive, the rectifier stage consists of a diode bridge. However, the rectifier stage 1 may also be of active type by comprising one or more identically controlled switching arms 10*a*, 10*b*, 10*c*. The rectifier stage 1 is thus controlled to control the current taken from the mains supply and to convert the AC voltage supplied by the mains supply into a DC voltage applied to the DC power supply bus. On a three-phase mains supply, the rectifier stage 1 comprises three switching arms 10*a*, 10*b*, 10*c* each connected to one of the three input phases R, S, T of the three-phase mains supply through the AC inductances. In a conventional configuration, each switching arm comprises, for example, two power transistors 100, for example of IGBT or JFET type, and a connection midpoint Ma, Mb, Mc situated between the two transistors and connected to an input phase R, S, T. The DC power supply bus links the rectifier stage 1 to the inverter stage 2. It comprises a power supply line with positive potential V+ and a power supply line with negative potential V−. At least one bus capacitor Cbus is connected to each of the two power supply lines of the bus and keeps the voltage of the bus at a constant value.

In FIG. 1, the inverter stage 2 is connected to the DC power supply bus, downstream of the bus capacitor Cbus. It comprises a number of identical switching arms 20*a*, 20*b*, 20*c* each connected to an output phase U, V, W linked to the electrical load C. For an electrical load C operating in three phase modes, the inverter stage 2 thus comprises three switching arms 20*a*, 20*b*, 20*c*. In an inverter stage 2 of conventional configuration (FIG. 1), each switching arm 20*a*, 20*b*, 20*c* comprises two power transistors 200 and a connection midpoint Pa, Pb, Pc situated between the two transistors and connected to the electrical load.

In a configuration similar to that of FIG. 1, the variable speed drive of FIG. 2 comprises a three-level active rectifier stage 1' of Wien bridge type and a three-level inverter stage 2' of NPC type. The DC power supply bus then comprises a number of bus capacitors Cbus1, Cbus2 and one or more power supply lines with intermediate potential. This well known topology is not described in detail in the present application but it should be understood that the invention as described below can be perfectly applied thereto, as well as to other topologies.

The variable speed drive also comprises first control means 3 for controlling the switchover of each of the switching arms of the rectifier stage 1, 1' and second control means 4 for controlling the switchover of each of the switching arms of the inverter stage 2, 2'. For each switchover of a power transistor of a switching arm, the first or second control means 3, 4 use a control by pulse width modulation (PWM) that makes it possible to define the instants of switchover of each transistor of the rectifier stage 1, 1' and of the inverter stage 2, 2'. The conventional control by PWM is of intersective type and entails comparing a symmetrical or asymmetrical triangular carrier with one or more modulants. The intersections between the carrier and the modulant or modulants define the instants of switchover on the closure and on the opening of the power transistor.

According to the invention, the first control means and the second control means may be shared and may comprise a common microprocessor managing both the control of the rectifier stage 1, 1' and that of the inverter stage 2, 2'.

The control method of the invention is applied to a converter which comprises the same number of switching arms, for example three switching arms, on the rectifier stage 1, 1' and on the inverter stage 2, 2', each arm comprising at least two power transistors. Preferentially, the number of levels of the rectifier stage 1, 1' is identical to the number of levels of the inverter stage 2, 2'. In FIG. 1, the two-level rectifier stage 1 is thus associated with a conventional two-level inverter stage 2. Similarly, in FIG. 2, the three-level rectifier stage 1' of "Wien" type is associated with a three-level inverter stage 2' of NPC type.

Hereinafter in the description, we will focus on the case of the conventional two-level variable speed drive as represented in FIG. 1.

The aim of the invention is to significantly reduce the common-mode current in a power converter, for example of variable speed drive type, which comprises an active rectifier stage 1 and an inverter stage 2.

This variable speed drive structure in fact has two sources of common-mode voltage linked to the presence of switchovers on the inverter stage 2 and on the rectifier stage 1. By switching over, the inverter stage 2 generates a common-mode voltage called Vmcinv and the rectifier stage 1 generates a common-mode voltage Vmcrec, these being defined by the following relationships:

$$Vmcinv = \frac{V_{U0} + V_{V0} + V_{W0}}{3}$$

$$Vmcrec = \frac{V_{R0} + V_{S0} + V_{T0}}{3}$$

In which:

$V_{U0}$, $V_{V0}$, $V_{W0}$ correspond to the single voltages on the output phases U, V, W of the inverter stage, referenced at the bottom point (O) of the DC power supply bus, $V_{R0}$, $V_{S0}$, $V_{T0}$ correspond to the single voltages of each arm of the rectifier stage, referenced at the bottom point (O) of the DC power supply bus.

The total common-mode voltage of the variable speed drive is equal to the sum of the disturbances supplied by the rectifier stage 1 and by the inverter stage 2. Since the common-mode voltages generated by the rectifier stage 1 and by the inverter stage 2 have opposite signs, the following relationship expressing the total common-mode voltage generated on the variable speed drive is obtained:

$$Vmc = \frac{V_{U0} + V_{V0} + V_{W0}}{3} - \frac{V_{R0} + V_{S0} + V_{T0}}{3}$$

Assuming that the rectifier stage 1 and the inverter stage 2 switch over at the same switching frequency, a variable speed drive with active rectifier therefore generates twice as many variations of the common-mode voltage as a conventional variable speed drive.

The principle of the invention is therefore to offset the common-mode voltage generated by the inverter stage 2 with the common-mode voltage generated by the rectifier stage 1, or vice versa.

For this, the control method of the invention consists in controlling the inverter stage 2 and the rectifier stage 1 in a synchronized manner (synchronized in time) so that a variation of potential (=rising edge or falling edge) applied to an input phase R, S, T always corresponds to a variation of potential (=rising edge or falling edge) of the same sign applied to an output phase U, V, W. For this, the first control means 3 dedicated to the rectifier stage 1 therefore have to be synchronized with the second control means 4 dedicated to the inverter stage 2.

Thus, theoretically, it involves implementing double switchovers between the rectifier stage 1 and the inverter stage 2 so that the generation of a rising voltage edge FM or of a falling voltage edge FD produced by the switchover of a switching arm of the rectifier stage 1 coincides with the generation of a rising voltage edge FM, and respectively falling voltage edge FD, produced by the switchover of a switching arm of the inverter stage 2. More specifically, for a pulse on a switching arm of the inverter stage 2, the generation of the rising voltage edge for this pulse coincides with the generation of a rising voltage edge of a pulse generated by a switching arm of the rectifier stage and the generation of the falling voltage edge of this pulse coincides with the generation of a falling voltage edge of another pulse which is therefore generated by another switching arm of the rectifier stage. The synchronization of the two edges (rising and falling) produced by a switching arm of the inverter stage is therefore performed with two different switching arms of the rectifier stage. Obviously, the same reasoning applies starting from a pulse from the rectifier stage 1. In this way, it is thus possible to produce a total synchronization of all the switchovers by observing determined selection rules such as those described below in association with FIG. 4.

The result of this is then that the common-mode voltage generated by a switchover of an arm on the rectifier stage 1 and the common-mode voltage generated by a switchover of an arm on the inverter stage 2 are compensated.

To produce a total synchronization, the first and second control means 3, 4 are configured so as to be able to shift in time each voltage pulse generated by the switching arms respectively of the rectifier stage 1 and of the inverter stage 2.

An example of total synchronization between the inverter stage (INV in FIG. 3) and the rectifier stage (REC in FIG. 3) is represented in FIG. 3. In this FIG. 3, each rising voltage edge FM generated by the control of a switching arm 10a, 10b, 10c of the rectifier stage 1 is synchronized in time with the generation of a rising voltage edge FM produced by the control of a switching arm 20a, 20b, 20c of the inverter stage 2. Similarly, each falling voltage edge FD generated by the control of a switching arm 10a, 10b, 10c of the rectifier stage 1 is synchronized in time with the generation of a falling voltage edge FD produced by the control of a switching arm 20a, 20b, 20c of the inverter stage 2.

An exemplary algorithm that makes it possible to achieve such total synchronization is represented in FIG. 4.

This algorithm comprises a number of successive steps implemented by the control means 3, 4.

A first, comparison step E consists in determining whether the longest pulse MaxRec to be applied to the rectifier stage 1 is longer than the longest pulse MaxInv to be applied to the inverter stage 2.

If not:

The falling voltage edge FD of the longest pulse MaxInv to be applied to the inverter stage 2 is synchronized with the falling voltage edge FD of the longest pulse MaxRec to be applied to the rectifier stage 1 (E0).

If the pulse of intermediate duration IntInv to be applied to the inverter stage 2 is longer than the pulse of intermediate duration IntRec to be applied to the rectifier stage 1 (E1):

the rising voltage edge FM corresponding to the longest pulse MaxRec to be applied to the rectifier stage 1 is synchronized with the rising voltage edge FM of the pulse of intermediate duration IntInv to be applied to the inverter stage 2 (E10), the falling voltage edge FD of the pulse of intermediate duration IntInv to be applied to the inverter stage 2 is synchronized with the falling edge FD of the pulse of intermediate duration IntRec to be applied to the rectifier stage 1 (E11), the rising voltage edge FM of the pulse of intermediate duration IntRec to be applied to the rectifier stage is synchronized with the rising voltage edge FM of the pulse of the shortest duration MinInv to be applied to the inverter stage 2 (E12), the falling voltage edge FD of the shortest pulse MinInv to be applied to the inverter stage 2 is synchronized with the falling voltage edge FD of the shortest pulse MinRec to be applied to the rectifier stage (E13), the rising voltage edge FM of the shortest pulse MinRec to be applied to the rectifier stage 1 is synchronized with the rising voltage edge FM of the longest pulse MaxInv to be applied to the inverter stage 2 (E14).

If the pulse of intermediate duration IntInv to be applied to the inverter stage is shorter than the pulse of intermediate duration IntRec to be applied to the rectifier stage 1 (E1):

the rising voltage edge FM of the longest pulse MaxRec to be applied to the rectifier stage is synchronized with the rising voltage edge FM of the shortest pulse MinInv to be applied to the inverter stage (E100), the falling voltage edge FD of the shortest pulse MinInv to be applied to the inverter stage is synchronized with the falling voltage edge FD of the shortest pulse MinRec to be applied to the rectifier stage (E101), the rising voltage edge FM of the shortest pulse MinRec to be applied to the rectifier stage 1 is synchronized with the rising voltage edge FM of the pulse of intermediate duration IntInv to be applied to the inverter stage (E102), the falling voltage edge FD of the pulse of intermediate duration IntInv to be applied to the inverter stage 2 is synchronized with the falling voltage edge FD of the pulse of intermediate duration IntRec to be applied to the rectifier stage (E103), the rising voltage edge FM of the pulse of intermediate duration IntRec to be applied to the rectifier stage 1 is synchronized with the rising voltage edge FM of the longest pulse MaxInv to be applied to the inverter stage (E104).

If yes:

The falling voltage edge FD of the longest pulse MaxRec to be applied to the rectifier stage 1 is synchronized with the falling edge FD of the longest pulse MaxInv to be applied to the inverter stage 2 (E00).

If the pulse of intermediate duration IntRec to be applied to the rectifier stage 1 is longer than the pulse of intermediate duration IntInv to be applied to the inverter stage 2 (E2):

the rising voltage edge FM of the longest pulse MaxInv to be applied to the inverter module 2 is synchronized with the rising voltage edge FM of the pulse of intermediate duration IntRec to be applied to the rectifier module (E20), the falling voltage edge FD of the pulse of intermediate duration IntRec to be applied to the rectifier module is synchronized with the falling voltage edge FD of the pulse of intermediate duration IntInv to be applied to the inverter module 2 (E21), the rising voltage edge FM of the pulse of intermediate duration IntInv to be applied to the inverter module 2 is synchronized with the rising voltage edge FM of the shortest pulse MinRec to be applied to the rectifier module (E22), the falling voltage edge FD of the shortest pulse MinRec to be applied to the rectifier module is synchronized with the falling voltage edge FD of the shortest pulse MinInv to be applied to the inverter module (E23), the rising voltage edge FM of the shortest pulse MinInv to be applied to the inverter module is synchronized with the rising voltage edge FM of the longest pulse MaxRec to be applied to the rectifier module (E24).

If the pulse of intermediate duration IntRec to be applied to the rectifier stage is shorter than the pulse of intermediate duration IntInv to be applied to the inverter stage (E2):

the rising voltage edge FM of the longest pulse MaxInv to be applied to the inverter stage is synchronized with the rising voltage edge FM of the shortest pulse MinRec to be applied to the rectifier module (E200), the falling voltage edge FD of the shortest pulse MinRec to be applied to the rectifier module is synchronized with the falling voltage edge FD of the shortest pulse MinInv to be applied to the inverter module (E201), the rising voltage edge FM of the shortest pulse MinInv to be applied to the inverter module is synchronized with the rising voltage edge FM of the pulse of intermediate duration IntRec to be applied to the rectifier module (E202), the falling voltage edge FD of the pulse of intermediate duration IntRec to be applied to the rectifier module is synchronized with the falling voltage edge FD of the pulse of intermediate duration IntInv to be applied to the inverter module (E203), the rising voltage edge FM of the pulse of intermediate duration IntInv to be applied to the inverter module 2 is synchronized with the rising voltage edge FM of the longest pulse MaxRec to be applied to the rectifier stage (E204).

According to the invention, the total synchronization as described hereinabove in association with FIGS. 3 and 4 between the rectifier stage 1 and the inverter stage 2 can be achieved for each switching period and operates systematically, the last two rising voltage edges being automatically synchronized. This is explained in particular by the fact that the sum of the widths of the pulses applied to the rectifier stage 1 is equal to the sum of the widths of the pulses applied to the inverter stage 2 and by the fact that, on the rectifier part, the pulse widths are added (course to the right in FIG. 3) whereas the pulse widths on the inverter part are subtracted (course to the left in FIG. 3).

Obviously it is possible, without departing from the framework of the invention, to devise other variants and refinements of detail and similarly consider the use of equivalent means.

The invention claimed is:

1. A control method to reduce common-mode current in a power converter which comprises:
    a rectifier stage connected to a number of input phases,
    an inverter stage connected to a number of output phases,
    a DC power supply bus linking the rectifier stage to the inverter stage and including a first power supply line and a second power supply line, to each of which is applied an electrical potential,
    the rectifier stage and the inverter stage each including at least two switching arms connected to the first power supply line and to the second power supply line,
    first control circuitry to selectively connect, in correspondence with switchover timing, each said input phase of the rectifier stage to one of the first power supply line and the second power supply line, second control circuitry to selectively connect, in correspondence with switchover timing, each said output phase of the inverter stage to one of the first power supply line and the second power supply line, the method comprising:

controlling, on each switching period, the rectifier stage and the inverter stage in synchronization with each other so that any variation of potential applied to each said input phase always coincides with a variation of potential of a same sign applied to a corresponding one of the output phases.

2. The method according to claim 1, wherein, on a switching period, generation of a rising voltage edge of a pulse produced by a first switching arm of the inverter stage coincides with generation of a rising voltage edge of a pulse produced by a first switching arm of the rectifier stage, and generation of a falling voltage edge of the pulse produced by the first switching arm of the inverter stage coincides with the generation of a falling voltage edge of a pulse produced by a second switching arm of the rectifier stage.

3. The method according to claim 1 or 2, wherein the rectifier stage and the inverter stage are controlled in synchronization with each other by action on pulse width modulation of respective signals applied to the rectifier stage and to the inverter stage.

4. The method according to claim 1, wherein the rectifier stage and the inverter stage are controlled in synchronization with each other by following determination rules, each said determination rule taking account of the switchover timing of each commutating arm of the inverter stage and of the rectifier stage.

5. The method according to claim 1, wherein the inverter stage is a Neutral Point Clamped (NPC) inverter.

6. A control system to reduce common-mode current in a power converter which comprises:

a rectifier stage connected to a number of input phases,
an inverter stage connected to a number of output phases,
a DC power supply bus linking the rectifier stage to the inverter stage and including a first power supply line and a second power supply line, to each of which is applied an electrical potential,
the rectifier stage and the inverter stage each including at least two switching arms connected to the first power supply line and to the second power supply line,
first control circuitry that employs a pulse width modulation to selectively connect each said input phase of the rectifier stage to one of the first power supply line and the second power supply line,
second control circuitry that employs a pulse width modulation to selectively connect each said output phase of the inverter stage to one of the first power supply line and the second power supply line,
wherein the first control circuitry and the second control circuitry are synchronized with each other so that any variation of potential applied to each said input phase always coincides with a variation of potential of a same sign applied to a corresponding one of the output phases.

7. The control system according to claim 6, wherein, on a switching period, the first control circuitry and the second control circuitry are controlled so that generation of a rising voltage edge of a pulse produced by a first switching arm of the inverter stage coincides with generation of a rising voltage edge of a pulse produced by a first switching arm of the rectifier stage, and generation of a falling voltage edge of the pulse produced by the first switching arm of the inverter stage coincides with generation of a falling voltage edge of a pulse produced by a second switching arm of the rectifier stage.

8. The control system according to claim 6 or 7, wherein the first control circuitry and the second control circuitry are configured to shift in time each voltage pulse generated by the respective switching arms of the rectifier stage and of the inverter stage.

9. The control system according to claim 6, wherein the rectifier stage and the inverter stage each include three of said switching arms with two power transistors on each said switching arm.

10. The control system according to claim 6, wherein the rectifier stage and the inverter stage are configured to generate a same number of electrical potential levels.

11. The control system according to claim 6, wherein the inverter stage is a Neutral Point Clamped (NPC) inverter.

* * * * *